US009414162B2

(12) United States Patent
Long et al.

(10) Patent No.: US 9,414,162 B2
(45) Date of Patent: Aug. 9, 2016

(54) SYSTEMS AND METHODS FOR ECHO REDUCTION (71) Applicant: Tencent Technology (Shenzhen) Company Limited, Shenzhen (CN)

(72) Inventors: Xingping Long, Shenzhen (CN); Hong Liu, Shenzhen (CN); Muyong Cao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 238 days.

(21) Appl. No.: 14/184,877

(22) Filed: Feb. 20, 2014

(65) Prior Publication Data

US 2014/0355751 A1 Dec. 4, 2014

Related U.S. Application Data (63) Continuation of application No. PCT/CN2013/088182, filed on Nov. 29, 2013.

(30) Foreign Application Priority Data

Jun. 3, 2013 (CN) .......................... 2013 1 0216306

(51) Int. Cl.
*H04R 3/02* (2006.01)
*H04M 9/08* (2006.01)
*H04B 3/23* (2006.01)

(52) U.S. Cl.
CPC . *H04R 3/02* (2013.01); *H04M 9/08* (2013.01); *H04B 3/231* (2013.01); *H04M 9/082* (2013.01)

(58) Field of Classification Search
None
See application file for complete search history.

(56) References Cited

U.S. PATENT DOCUMENTS 5,646,990 A * 7/1997 Li .......................... H04M 9/082
379/390.01
6,928,161 B1 * 8/2005 Graumann ............. H04B 3/231
379/390.02

(Continued)

FOREIGN PATENT DOCUMENTS

CN 1717720 A 1/2006
CN 1858845 A 11/2006

(Continued)

OTHER PUBLICATIONS

Patent Cooperation Treaty, International Search Report and Written Opinion of the International Searching Authority, PCT/CN2013/088182, mailed Mar. 13, 2014.

(Continued)

*Primary Examiner* — Fan Tsang
*Assistant Examiner* — Jeffrey Lytle
(74) *Attorney, Agent, or Firm* — Jones Day (57) ABSTRACT Systems and methods are provided for echo reduction. For example, first audio data associated with a current time unit is obtained, the first audio data being generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit; third audio data transmitted by the sender during a second time unit preceding the current time unit is obtained; and fourth audio data is obtained by performing echo reduction on the first audio data based on at least information associated with the third audio data.

11 Claims, 6 Drawing Sheets

(56) References Cited

U.S. PATENT DOCUMENTS

| | | | |
|---|---|---|---|
| 2004/0001450 A1* | 1/2004 | He | H04B 3/23 370/286 |
| 2004/0120271 A1 | 6/2004 | LaBlanc | |
| 2007/0165837 A1* | 7/2007 | Zhong | H04M 9/082 379/406.01 |
| 2014/0254813 A1* | 9/2014 | Anderton | H04R 3/02 381/66 |

FOREIGN PATENT DOCUMENTS

| | | |
|---|---|---|
| CN | 101878637 A | 11/2010 |
| CN | 102025852 A | 4/2011 |

OTHER PUBLICATIONS

Patent Cooperation Treaty, International Preliminary Report on Patentability, PCT/CN2013/088182, issued Dec. 8, 2015.

* cited by examiner

SYSTEMS AND METHODS FOR ECHO REDUCTION

CROSS-REFERENCES TO RELATED APPLICATIONS

This application is a continuation of International Application No. PCT/CN2013/088182, with an international filing date of Nov. 29, 2013, now pending, which claims priority to Chinese Patent Application No. 201310216306.6, filed Jun. 3, 2013, both applications being incorporated by reference herein for all purposes.

BACKGROUND OF THE INVENTION

Certain embodiments of the present invention are directed to computer technology. More particularly, some embodiments of the invention provide systems and methods for signal processing. Merely by way of example, some embodiments of the invention have been applied to audio signals. But it would be recognized that the invention has a much broader range of applicability.

With the development of voice communication technology, voice communication over the Internet has become increasingly popular. During voice communication between two parties, audio signals are often transmitted by a sender over the network to a receiver, and output from an audio-playback device. Such audio signals often propagate through air to an audio-acquisition device of the receiver, and are sent back to the sender together with audio signals generated by the receiver. Then a user using the sender can hear his/her own voice which corresponds to echoes generated during voice communication. To improve the quality of voice communication, echo reduction often needs to be performed.

Currently, echo reduction usually includes: audio data 1 transmitted by the sender at a current time is received by the receiver and a copy of the audio data 1 is made. The audio data 1 is output from the audio-playback device to generate an audio signal A1. The audio-acquisition device of the receiver acquires at the current time audio signals which include an audio signal B related to a user's voice and another audio signal A2 output from the audio-playback device. Audio data 2 are generated based on the acquired audio signals. Echo reduction is performed on the audio data 2 based on the copy of the audio data 1 to generate audio data 3. Usually, there is a delay for audio signals to propagate through air from the audio-playback device to the audio-acquisition device. In addition, the audio-playback device and the audio-acquisition device are associated with some delay factors. The audio signal A2 corresponds to an audio signal output previously from the audio-playback device before the current time. That is, the audio signal A2 corresponds to an audio signal output from the audio-playback device before the audio signal A1.

The above-noted conventional technology has some disadvantages. For example, as the audio signal A2 corresponds to an audio signal output from the audio-playback device before the audio signal A1, the audio data 3 generated by performing echo reduction on the audio data 2 based on the copy of the audio data 1 may still include echoes, no as to reduce the echo-reduction efficiency.

Hence it is highly desirable to improve the techniques for echo reduction.

BRIEF SUMMARY OF THE INVENTION

According to one embodiment, a method is provided for echo reduction. For example, first audio data associated with a current time unit is obtained, the first audio data being generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit; third audio data transmitted by the sender during a second time unit preceding the current time unit is obtained; and fourth audio data is obtained by performing echo reduction on the first audio data based on at least information associated with the third audio data.

According to another embodiment, a device for echo reduction includes the first acquisition module, the second acquisition module, and the echo-reduction module. The first acquisition module is configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit. The second acquisition module is configured to obtain third audio data transmitted by the sender during a second time unit preceding the current time unit. The echo-reduction module is configured to obtain fourth audio data by performing echo reduction on the first audio data based on at least information associated with the third audio data.

According to yet another embodiment, a non-transitory computer readable storage medium includes programming instructions for echo reduction. The programming instructions are configured to cause one or more data processors to execute certain operations. For example, first audio data associated with a current time unit is obtained, the first audio data being generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit; third audio data transmitted by the sender during a second time unit preceding the current time unit is obtained; and fourth audio data is obtained by performing echo reduction on the first audio data based on at least information associated with the third audio data.

For example, the systems and methods described herein are configured to performs echo reduction through audio data transmitted by a sender during a particular time unit preceding a current time unit and another audio data generated by an audio-acquisition device of a receiver during the current time unit, and perform time alignment on the audio data acquired and generated by the audio-acquisition device of the receiver during the current time unit and the audio data associated with the preceding time unit, so as to reduce a delay caused by various factors and improve the efficiency of echo reduction.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
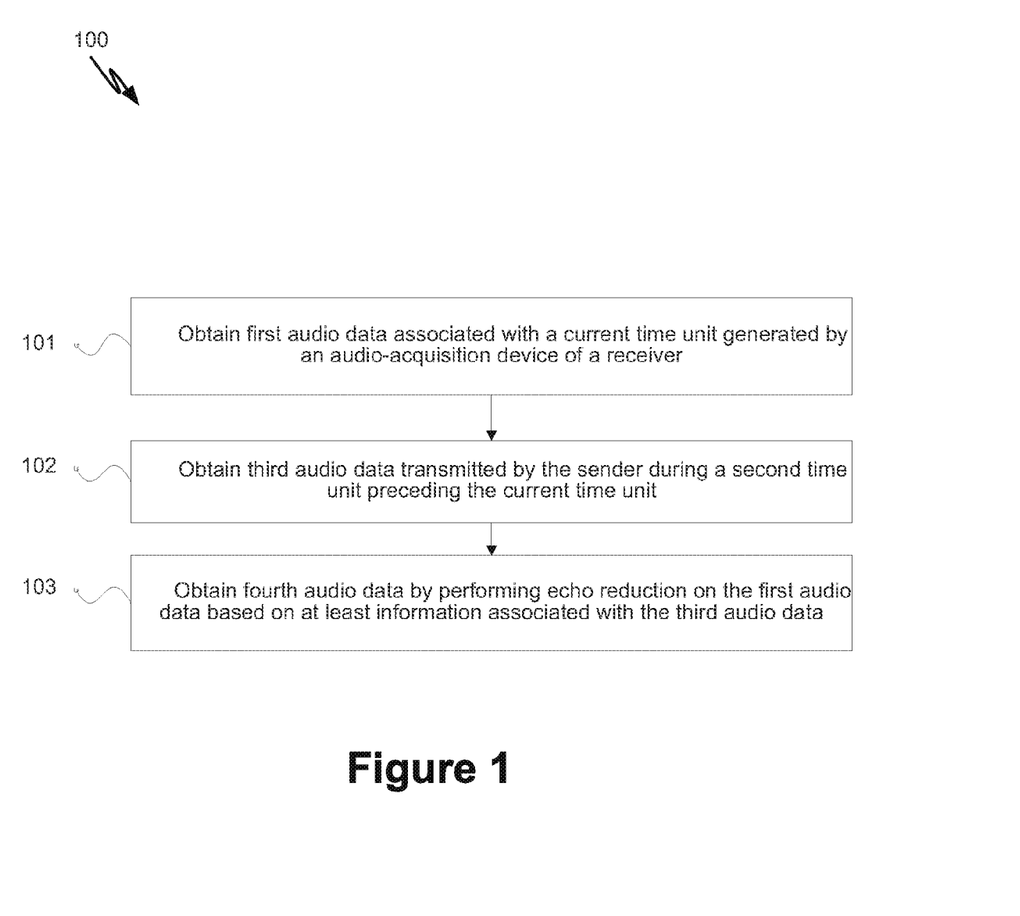
FIG. 1 is a simplified diagram showing a method for echo reduction according to one embodiment of the present invention.

FIG. 1 is a simplified diagram showing a method for echo reduction according to one embodiment of the present invention. This diagram is merely an example, which should not unduly limit the scope of the claims. One of ordinary skill in the art would recognize many variations, alternatives, and modifications. The method 100 includes at least the processes 101-103.

According to one embodiment, the process 101 includes: obtaining first audio data associated with a current time unit generated by an audio-acquisition device of a receiver based on at least information associated with a first audio signal acquired by the audio-acquisition device and a second audio signal output from an audio-playback device of the receiver. For example, the second audio signal is output from the audio-playback device of the receiver based on at least information associated with second audio data transmitted previously by a sender before the current time unit. In another example, the process 102 includes: obtaining third audio data transmitted by the sender during a second time unit preceding the current time unit. In yet another example, the process 103 includes: obtaining fourth audio data by performing echo reduction on the first audio data based on at least information associated with the third audio data.

Figure 2:
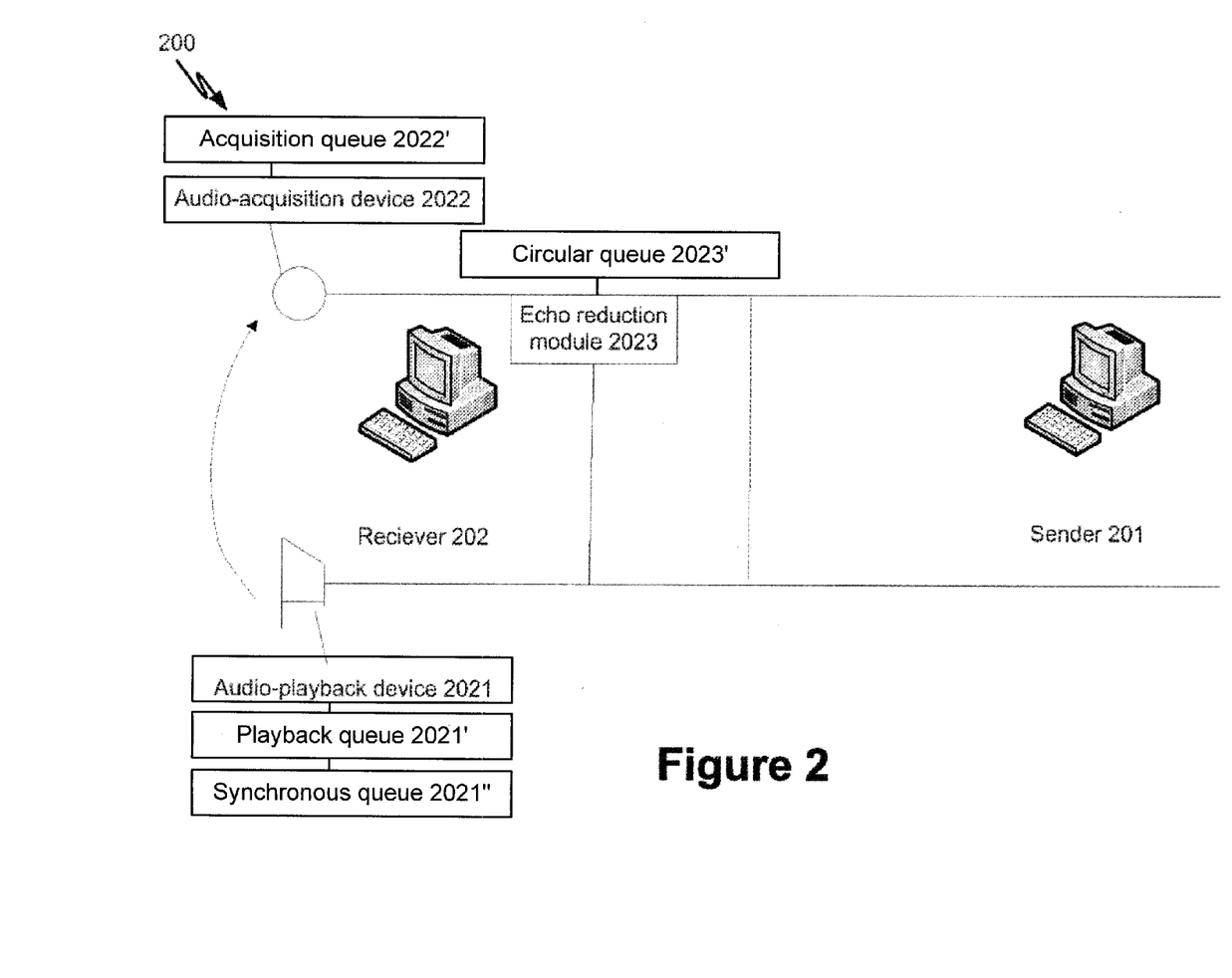
FIG. 2 is a simplified diagram showing an execution environment for echo reduction according to one embodiment of the present invention.

FIG. 2 is a simplified diagram showing an execution environment for echo reduction according to one embodiment of the present invention. This diagram is merely an example, which should not unduly limit, the scope of the claims. One of ordinary skill in the art would recognize many variations, alternatives, and modifications.

In some embodiments, the execution environment 200 includes a sender 201 and a receiver 202. For example, the receiver 202 includes an audio-playback device 2021 coupled to playback queue 2021', synchronous queue 2021" coupled to playback queue 2021', an audio-acquisition device 2022 coupled to acquisition queue 2022', and an echo-reduction module 2023 coupled to circular queue 2023'. In another example, echoes are generated when an audio signal is transmitted to the audio-acquisition device 2022 through the audio-playback device 2021. In yet another example, the echo-reduction module 2023 is used for reducing the generated echoes. Playback queue 2021', synchronous queue 2021", acquisition queue 2022', and circular queue 2023' can be used in a manner such as described herein with reference to FIGS. 3-6.

Figure 3:
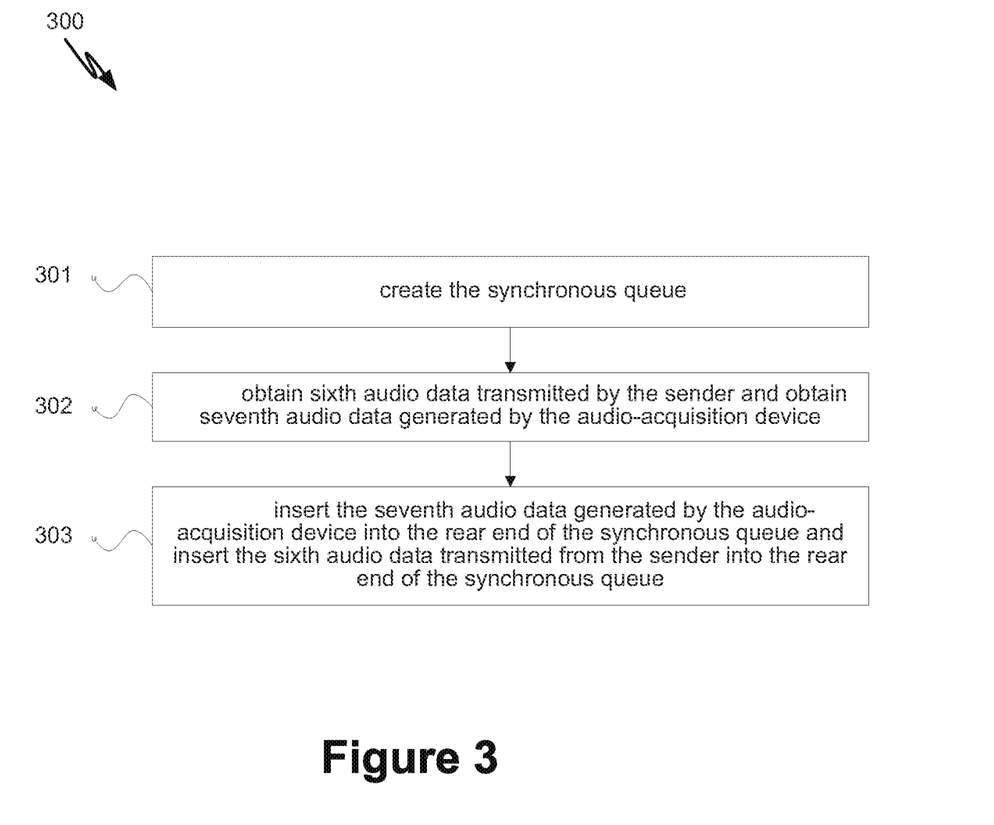
FIG. 3 is a simplified diagram showing a method for echo reduction according to another embodiment of the present invention.

FIG. 3 is a simplified diagram showing a method for echo reduction according to another embodiment of the present invention. This diagram is merely an example, which should not unduly limit the scope of the claims. One of ordinary skill in the art would recognize many variations, alternatives, and modifications. The method 300 includes at least the processes 301-303.

According to one embodiment, the process 301 includes: creating a synchronous queue. For example, the acquisition queue contains user-generated audio data and remote audio data. As an example, the remote audio data is associated with an audio signal that is output from a playback queue during a previous time unit and propagates through air to the audio-acquisition device. In another example, the user-generated audio data and the remote audio data constitute near-end audio data in the acquisition queue. In yet another example, due to a delay caused by the propagation of the audio signal through air during the previous time unit, the near-end audio data recorded in the acquisition queue at the current time and the remote audio data output from the playback queue acquired by a self-adaptive filter are not synchronized (e.g., not being recorded and output at a same time). In yet another example, the synchronous queue is created to cache the playback queue. When the delay elapses, computation is made using an echo-reduction algorithm on the audio data in the acquisition queue and the cached audio data in the synchronous queue to reduce echoes recorded in the acquisition queue, in some embodiments.

According to another embodiment, the process 302 includes: obtaining sixth audio data transmitted by the sender, and obtaining seventh audio data generated by the audio-acquisition device. For example, during the creation and initialization of the synchronous queue, the audio data in the current playback queue corresponding to the audio data transmitted by the sender, and the audio data in the current acquisition queue corresponding to the audio data acquired and generated by the audio-acquisition device are obtained. In another example, the audio-acquisition device is related to the receiver.

According to yet another embodiment, the process 303 includes: inserting the seventh audio data generated by the audio-acquisition device into the rear end of the synchronous queue and inserting the sixth audio data transmitted from the sender into the rear end of the synchronous queue. For example, after the initialization of the synchronous queue, the audio data obtained from the acquisition queue at the present moment and the audio data obtained from the playback queue at the present moment together constitute the length of the synchronous queue at the present moment. In another example, the length of the synchronous queue at the present moment corresponds to the duration of the entire delay. In yet another embodiment, the echo-reduction algorithm is then applied based on at least information associated with the audio data in both the synchronous queue and the acquisition queue. In yet another example, the process of applying the echo-reduction algorithm includes: obtaining audio data of a same length (e.g., 20 ms) from a front end of the synchronous queue and a front end of the acquisition queue respectively. In yet another example, as the audio data (e.g., 20 ms) at the front end of the synchronous queue is obtained from the current acquisition queue, such audio data is the same as the audio data (e.g., 20 ms) obtained from the acquisition queue, and thus the echo-reduction algorithm may not eliminate the echoes in these audio data. Similarly, the echoes may not be eliminated from all audio data at the front end of the synchronous queue obtained from the acquisition queue, in some embodiments. For example, the audio data in the acquisition queue is compared with the audio data at the front end of the synchronous queue, and certain audio data with a same length may be discarded, and the process of applying the echo-reduction algorithm is not executed on these audio data. In another example, the computation using the echo-reduction algorithm is performed for the audio data in the acquisition queue and the audio data in the synchronous queue. The computed audio data is transmitted to a receiving party, in certain embodiments. Although the echoes cannot be eliminated, the amount of the audio data in the acquisition queue during the present cycle is not large and can be regarded as negligible, for example.

According to yet another embodiment, when the process of applying the echo-reduction algorithm begins again during a next cycle, the audio data in the playback queue of the next cycle is obtained and inserted into the rear end of the synchronous queue. For example, the audio data in the acquisition queue of the next cycle is obtained. At the present moment, the front end of the synchronous queue includes the audio data in the playback queue obtained from the previous cycle. As an example, the echoes in the acquisition queue correspond to the audio data in the playback queue obtained during the previous cycle. As another example, the near-end audio data in the acquisition queue is aligned with the remote audio data in the playback queue, and the echo-reduction algorithm is performed on these audio data. The echoes in the acquisition queue can be reduced based on at least information associated with these time-aligned audio data, in some embodiments.

In one embodiment, when creating the synchronous queue, the audio data in the acquisition queue includes: an audio signal A0 output from the audio-playback device during the previous time unit and a voice signal B1 from a user B during the current time unit. That is, the audio data in the acquisition queue at the present moment includes B1+A0. For example, the audio data in the playback queue includes: an audio signal A1 obtained during the current time unit. That is, the audio data in the playback queue at the present moment includes A1. In another example, after inserting the audio data in the acquisition queue and the audio data in the playback queue into the synchronous queue, the audio data in the synchronous queue includes B1+A0+A1. In yet another example, audio data of a predetermined duration of 20 ms is obtained from the acquisition queue and the synchronous queue respectively, and computation is performed using the echo-reduction algorithm. In yet another example, the audio data at the front end of the synchronous queue and the audio data in the acquisition queue are identical. The echoes in the acquisition queue may not be eliminated, in some embodiments. For example, audio data is extracted periodically from the acquisition queue and the synchronous queue, and processed through the echo-reduction algorithm until the audio data in the acquisition queue in the current unit is processed and the echoes cannot be reduced. In another example, the audio data in the acquisition queue in a next time unit includes B2+A1, where A1 corresponds to the audio signal output from the audio-playback device at a previous time unit and acquired and obtained by the audio-acquisition device after propagating through air. In yet another example, the audio data in the playback queue includes A2. In yet another example, audio data of a predetermined duration of 20 ms is obtained from the front end of the acquisition queue and the front end of the synchronous queue respectively, and computation is performed using the echo-reduction algorithm. In yet another example, the audio data in the acquisition queue includes B2+A1 (e.g., with the duration of 20 ms). In yet another example, as B1+A0 pop out of the synchronous queue during the previous time unit, the audio data extracted from the synchronous queue at the present moment includes A1 (e.g., with a duration of 20 ms). In yet another example, the echo-reduction algorithm is performed on B2+A1 to remove A1.

Figure 4:
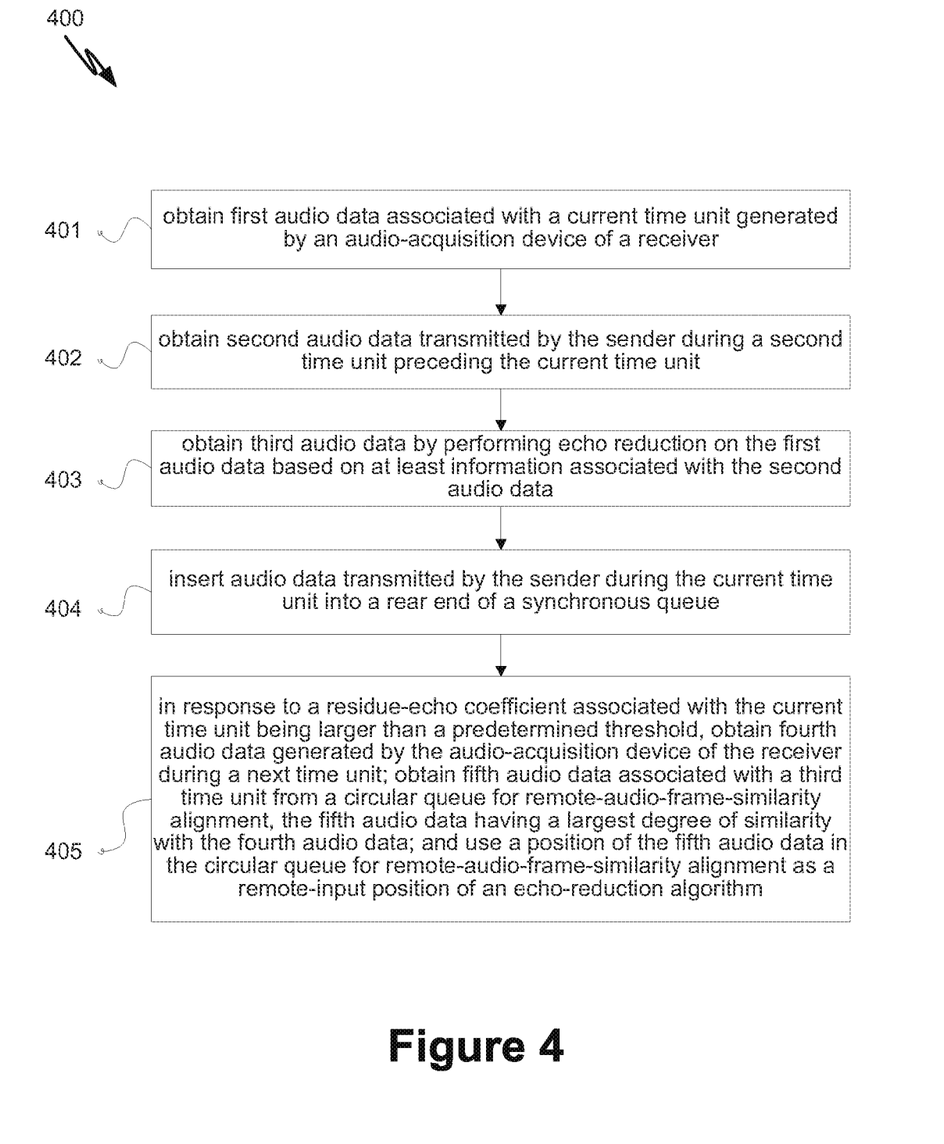
FIG. 4 is a simplified diagram showing a method for echo reduction according to yet another embodiment of the present invention.

FIG. 4 is a simplified diagram showing a method for echo reduction according to yet another embodiment of the present invention. This diagram is merely an example, which should not unduly limit the scope of the claims. One of ordinary skill in the art would recognize many variations, alternatives, and modifications. The method 400 includes at least the processes 401-405.

According to one embodiment, the process 401 includes: obtaining first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with audio data transmitted previously by a sender before the current time unit. For example, the process 401 includes: obtaining audio data with a duration of one time unit from a front end of an acquisition queue as the first audio data associated with the current time unit. As an example, the acquisition queue is configured to store audio data generated by the audio-acquisition device during the current time unit based on at least information associated with the first audio signal related to a user voice and the second audio signal output from the audio-playback device of the receiver.

According to another embodiment, the process 402 includes: obtaining second audio data transmitted by the sender during a second time unit preceding the current time unit. For example, the process 402 includes: obtaining audio data with a duration of one time unit from a font end of a synchronous queue as the second audio data transmitted by the sender during the second time unit preceding the current time unit. In another example, the synchronous queue is configured to store audio data transmitted by the sender during multiple consecutive time units. In yet another example, audio data associated with the current time unit transmitted by the sender is stored at a rear end of the synchronous queue.

According to yet another embodiment, the process 403 includes: obtaining third audio data by performing echo reduction on the first audio data based on at least information associated with the second audio data. For example, the process 403 includes: obtaining the third audio data by performing echo reduction through the echo-reduction algorithm on the first audio data based on at least information associated with the second audio data. As an example, echo reduction is performed using an echo-reduction module (e.g., the module 2023). In another example, the process 404 includes: inserting audio data transmitted by the sender during the current time unit into a rear end of a synchronous queue. As an example, audio data obtained at every time unit in the playback queue is inserted into the rear end of the synchronous queue.

In one embodiment, the process 405 includes: in response to a residue-echo coefficient associated with the current time unit being larger than a predetermined threshold, obtaining fourth audio data generated by the audio-acquisition device of the receiver during a next time unit; obtaining fifth audio data associated with a third time unit from a circular queue for remote-audio-frame-similarity-alignment-and-computation, the fifth audio data having a largest degree of similarity with the fourth audio data; and using a position of the fifth audio data in the circular queue for remote-audio-frame-similarity-alignment-and-computation as a remote-input position of an echo-reduction algorithm. For example, clock offsets or initial errors may lead to an excessive delay between the remote audio data and near-end audio data, and the excessive delay far exceeds the synchronization capability of the synchronous queue. As an example, a starting query position of the circular queue for remote-audio-frame-similarity-alignment-and-computation (e.g., in the echo-reduction module) needs to be adjusted. In another example, the process for adjusting the starting query position of the circular queue for remote-audio-frame-similarity-alignment-and-computation includes: (1) computing a first cross-correlation coefficient of the first audio data and the second audio data, and computing a second cross-correlation coefficient of the first audio data and the third audio data. For example, cross-correlation calculations are performed on output data of the echo-reduction algorithm and the data obtained from the acquisition queue, and whether near-end voice signals or other near-end audio input are present in the near-end audio data. As an example, the first cross-correlation coefficient Rxd of the first audio data and the second audio data is calculated, and then the second cross-correlation coefficient Rde of the first audio data and the third audio data is calculated. In another example, the process for adjusting the starting query position of the circular queue for remote-audio-frame-similarity-alignment-and-computation further includes: (2) calculating a first signal energy, iEnergy, of the first audio data based on the first audio data, and calculating a second signal energy, iEnergy, of the third audio data based on the third audio data. As an example, the first signal energy and the second signal energy are calculated separately using a predetermined algorithm.

In another embodiment, the process for adjusting the starting query position of the circular queue for remote-audio-frame-similarity-alignment-and-computation further includes: (3) based on the first cross-correlation coefficient and the second cross-correlation coefficient, determining whether near-end voice signals or other near-end audio input are present in the first audio data, and determining whether echoes are present in the first audio data. For example, if the first cross-correlation coefficient is less than a second predetermined threshold, and the second cross-correlation coefficient is larger than a third predetermined threshold, near-end voice signals or other near-end audio input are determined to be present in the first audio data. Otherwise, near-end voice or other near-end audio input is determined to not be present in the first audio data. In another example, if Rde>0.98f and Rxd<0.1f, it indicates that there are people speaking near-end or other near-end audio input in the first audio data. In yet another example, when near-end voice signals or other near-end audio input are present in the first audio data, it can be expressed as: NearTalk=1. If near-end voice or other near-end audio input is not present, it can be expressed as: NearTalk=0. In yet another example, if the first cross-correlation coefficient is 0, it is determined that the first audio data does not contain echoes. In yet another example, if the first cross-correlation coefficient is not 0 and there is near-end voice signals or other proximal audio input in the first audio data, it is determined that the first audio data does not contain echoes. In yet another example, if the first cross-correlation coefficient is not 0 and there is no near-end audio signals in the first audio data, it is determined that the first audio data contains echoes. In yet another example, if the first audio data contains echoes, it is expressed as Echo=1, and if the first audio data does not contain echo, it is expressed as Echo=0. As an example, when Rxd is 0 (i.e., the first audio data and the second audio data are completely unrelated), it indicates that the first audio data does not contain echoes. As another example, when Rxd is not 0 and NearTalk is 1, it indicates that the first audio data does not contain echoes. As yet another example, when Rxd is not 0 and NearTalk is not 1, it indicates that the first audio data contains echoes.

In yet another embodiment, the process for adjusting the starting query position of the circular queue for remote-audio-frame-similarity-alignment-and-computation further includes: (4) obtaining the residue-echo coefficient computed in a previous cycle, and computing the residue-echo coefficient for a current cycle based on the first signal energy, iEnergy, the second signal energy, oEnergy, the condition of the presence of near-end audio signals in the first audio data, the condition of the presence of echoes in the second audio data and the residue-echo coefficient. For example, the residue-echo coefficient (EchoWorse) represents a cumulative value of residue echoes obtained from and periodically recorded according to a predetermined algorithm. In another example, the residue-echo coefficient determines whether to enter a process for secondary synchronization. As an example, the process for calculating EchoWorse includes:
if NearTalk is 0, Echo is 1, oEnergy<0.1*iEnergy, and EchoWorse>10, processing EchoWorse as: EchoWorse=EchoWorse−2;
if NearTalk is 0, Echo is 1, and oEnergy<0.5*iEnergy, processing EchoWorse as: Echo Worse++;
if NearTalk is 0, Echo is 1, and oEnergy>0.1*iEnergy, processing EchoWorse as: Echo Worse=EchoWorse+2;
if NearTalk is 0, Echo is not 1, and oEnergy>0.1*iEnergy, processing Echo Worse as: EchoWorse++;
if is 0, Echo is 1, oEnergy<0.1*iEnergy, and EchoWorse>2, processing EchoWorse as: EchoWorse−−;
if NearTalk is 0. Echo is 0, and oEnergy>0.85*iEnergy, processing EchoWorse as: EchoWorse=EchoWorse+2.

In some embodiments, the above processing of EchoWorse includes:

```
if( NearTalk == 0 )
{
    if( Echo ==1 )
    {
        if( oEnergy< 0.1*iEnergy )
        {
            if( EchoWorse> 10 )
            {
                EchoWorse= EchoWorse− 2;
            }
        }else if( oEnergy< 0.5*iEnergy )
        {
            EchoWorse++;
        }else
        {
            EchoWorse= EchoWorse+ 2;
        }
    }
    else
    {
        if( oEnergy> iEnergy )
        {
            EchoWorse++;
        }
    }
}
else
{
    if( oEnergy< 0.1*iEnergy )
    {
        if( EchoWorse> 2 )
        {
            EchoWorse−−;
        }
    }
    else if( oEnergy> 0.85*iEnergy )
    {
        EchoWorse =EchoWorse+2;
    }
}
```

In some embodiments, the calculation method of EchoWorse is determined based on at least information associated with whether near-end spoken voice is present in the first audio data, whether echoes are present in the first audio data, the first signal energy and second signal energy.

According to one embodiment, the process for adjusting the starting query position of the circular queue for remote-audio-frame-similarity-alignment-and-computation further includes: (5) if the residue-echo coefficient associated with the current time unit is larger than the predetermined threshold, waiting for a next time unit to obtain the fourth audio data generated by the audio-acquisition device of the receiver during the next time unit. For example, beginning from the front end of the circular queue for remote-audio-frame-similarity-alignment-and-computation, audio data with a predetermined duration is selected sequentially and cross-correlation computations are performed separately for each selected audio data together with the fourth audio data to obtain cross-correlation coefficients. As an example, the audio data with a largest calculated cross-correlation coefficient is chosen, and a data position associated with the chosen audio data in the circular queue for remote-audio-frame-similarity-alignment-and-computation is used as a remote input position of the echo-reduction algorithm. In another example, after the calculation process for EchoWorse is completed, the EchoWorse value is compared with a predetermined echo threshold. Assuming that the predetermined echo threshold is 50, if the EchoWorse value is larger than the predetermined echo threshold, a secondary synchronization process is triggered to modify the input position of data in the circular queue for remote-audio-frame-similarity-alignment-and-computation (e.g., in the echo-reduction module), in some embodiments. For example, the circular queue for remote-audio-frame-similarity-alignment-and-computation corresponds to a buffer queue related to the echo-reduction module and is configured to store data extracted from the synchronous queue. As an example, when audio data with a duration of 20 ms is obtained from the synchronous queue, the audio data is inserted into the circular queue for remote-audio-frame-similarity-alignment-and-computation which stores audio data with a total duration of 1 s from the synchronous queue.

Figure 5:
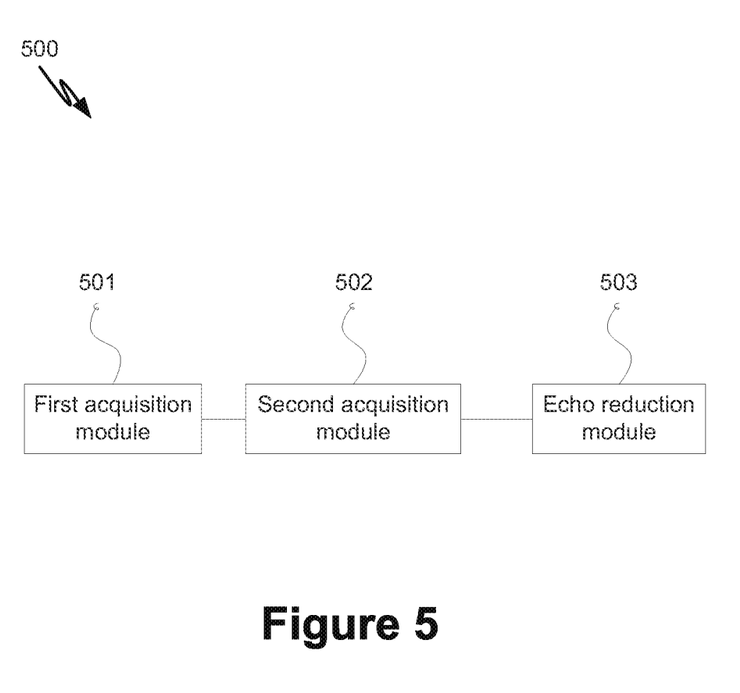
FIG. 5 is a simplified diagram showing a device for echo reduction according to one embodiment of the present invention.

FIG. 5 is a simplified diagram showing a device for echo reduction according to one embodiment of the present invention. This diagram is merely an example, which should not unduly limit the scope of the claims. One of ordinary skill in the art would recognize many variations, alternatives, and modifications. The device 500 includes a first acquisition module 501, a second acquisition module 502, and an echo-reduction module.

According to one embodiment, the first acquisition module 501 is configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit. For example, the second acquisition module 502 is configured to obtain third audio data transmitted by the sender during a second time unit preceding the current time unit. In another example, the echo-reduction module 503 is configured to obtain fourth audio data by performing echo reduction on the first audio data based on at least information associated with the third audio data.

Figure 6:
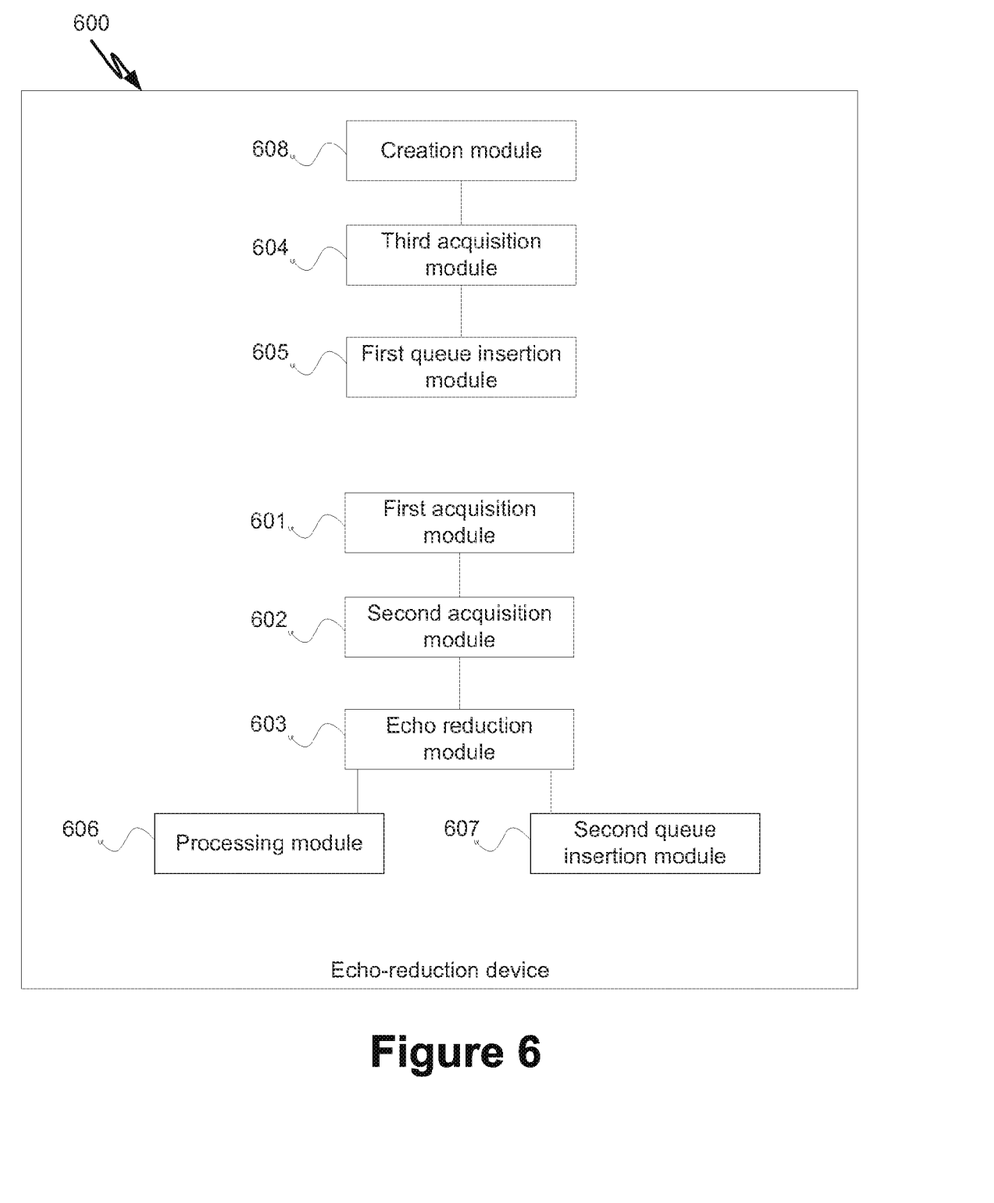
FIG. 6 is a simplified diagram showing a device for echo reduction according to another embodiment of the present invention.

FIG. 6 is a simplified diagram showing a device for echo reduction according to another embodiment of the present invention. This diagram is merely an example, which should not unduly limit the scope of the claims. One of ordinary skill in the art would recognize many variations, alternatives, and modifications. The device 600 includes at least a first acquisition module 601, a second acquisition module 602, and an echo-reduction module 603.

According to one embodiment, the first acquisition module 601 is configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit. For example, the second acquisition module 602 is configured to obtain third audio data transmitted by the sender during a second time unit preceding the current time unit. In another example, the echo-reduction module 603 configured to obtain fourth audio data by performing echo reduction on the first audio data based on at least information associated with the third audio data. In yet another example, the first acquisition module 601 is further configured to: obtain the first audio data associated with the current time unit from a front end of an acquisition queue. In yet another example, the acquisition queue is configured to store fifth audio data generated by the audio-acquisition device during the current time unit based on at least information associated with the first audio signal related to a user voice and the second audio signal output from the audio-playback device of the receiver.

According to another embodiment, the second acquisition module 602 is further configured to: obtain the third audio data transmitted by the sender during the second time unit preceding the current time unit from a front end of a synchronous queue. For example, the synchronous queue is configured to store fourth audio data transmitted by the sender during multiple consecutive third time units. In another example, fifth audio data associated with the current time unit transmitted by the sender is stored at a rear end of the synchronous queue.

According to yet another embodiment, the device 600 further includes: a creation module 608 configured to create the synchronous queue, a third acquisition module 604 configured to obtain sixth audio data transmitted by the sender and obtain seventh audio data generated by the audio-acquisition device, and a first queue insertion module 605 configured to insert the seventh audio data generated by the audio-acquisition device into the rear end of the synchronous queue and insert the sixth audio data transmitted from the sender into the rear end of the synchronous queue. For example, the echo-reduction module 603 is further configured to: obtain the fourth audio data by performing echo reduction through an echo-reduction algorithm on the first audio data based on at least information associated with the third audio data. In another example, the device 600 further includes: a processing module 606 configured to, in response to a residue-echo coefficient associated with the current time unit being larger than a predetermined threshold, obtain fifth audio data generated by the audio-acquisition device of the receiver during a next time unit; obtain sixth audio data associated with a third time unit from a circular queue for remote-audio-frame-similarity-alignment-and-computation, the sixth audio data having a largest degree of similarity with the fifth audio data; and using a position of the sixth audio data in the circular queue for remote-audio-frame-similarity-alignment-and-computation as a remote-input position of the echo-reduction algorithm. In one embodiment, the device 600 further includes: a second queue insertion module 607 configured to insert audio data transmitted by the sender during the current time unit into a rear end of a synchronous queue.

According to one embodiment, a method is provided for echo reduction. For example, first audio data associated with a current time unit is obtained, the first audio data being generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit; third audio data transmitted by the sender during a second time unit preceding the current time unit is obtained; and fourth audio data is obtained by performing echo reduction on the first audio data based on at least information associated with the third audio data. For example, the method is implemented according to at least FIG. 1, FIG. 3, and/or FIG. 4.

According to another embodiment, a device for echo reduction includes the first acquisition module, the second acquisition module, and the echo-reduction module. The first acquisition module is configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit. The second acquisition module is configured to obtain third audio data transmitted by the sender during a second time unit preceding the current time unit. The echo-reduction module is configured to obtain fourth audio data by performing echo reduction on the first audio data based on at least information associated with the third audio data. For example, the device is implemented according to at least FIG. 5, and/or FIG. 6.

According to yet another embodiment, a non-transitory computer readable storage medium includes programming instructions for echo reduction. The programming instructions are configured to cause one or more data processors to execute certain operations. For example, first audio data associated with a current time unit is obtained, the first audio data being generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit; third audio data transmitted by the sender during a second time unit preceding the current time unit is obtained; and fourth audio data is obtained by performing echo reduction on the first audio data based on at least information associated with the third audio data. For example, the storage medium is implemented according to at least FIG. 1, FIG. 3, and/or FIG. 4.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for echo reduction, the method comprising:
 obtaining first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit;
 obtaining third audio data transmitted by the sender during a second time unit preceding the current time unit;
 obtaining fourth audio data by performing echo reduction on the first audio data based on at least information associated with the third audio data; and
 in response to a residue-echo coefficient associated with the current time unit being larger than a predetermined threshold,
  obtaining fifth audio data generated by the audio-acquisition device of the receiver during a next time unit;
  obtaining sixth audio data associated with a third time unit from a circular queue for remote-audio-frame-similarity-alignment-and-computation, the sixth audio data having a largest degree of similarity with the fifth audio data; and
  using a position of the sixth audio data in the circular queue for remote-audio-frame-similarity-alignment-and-computation as a remote-input position of an echo-reduction algorithm;
 wherein the obtaining fourth audio data by performing echo reduction on the first audio data based on at least information associated with the third audio data includes: obtaining the fourth audio data by performing echo reduction through the echo-reduction algorithm on the first audio data based on at least information associated with the third audio data.

2. The method of claim 1, wherein the obtaining the first audio data associated with the current time unit generated by the audio-acquisition device of the receiver includes:
 obtaining the first audio data associated with the current time unit from a front end of an acquisition queue;
 wherein the acquisition queue is configured to store seventh audio data generated by the audio-acquisition device during the current time unit based on at least information associated with the first audio signal related to a user voice and the second audio signal output from the audio-playback device of the receiver.

3. The method of claim 1, wherein the obtaining the third audio data transmitted by the sender during the second time unit preceding the current time unit includes:
 obtaining the third audio data transmitted by the sender during the second time unit preceding the current time unit from a front end of a synchronous queue;
 wherein:
  the synchronous queue is configured to store consecutive audio data transmitted by the sender during multiple consecutive third time units; and
  seventh audio data associated with the current time unit transmitted by the sender is stored at a rear end of the synchronous queue.

4. The method of claim 1, further comprising:
 inserting seventh audio data transmitted by the sender during the current time unit into a rear end of a synchronous queue.

5. A method for echo reduction, the method comprising:
 obtaining first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit;
 obtaining third audio data transmitted by the sender during a second time unit preceding the current time unit;
 creating a synchronous queue;
 obtaining fourth audio data by performing echo reduction on the first audio data based on at least information associated with the third audio data;
  wherein the obtaining the third audio data transmitted by the sender during the second time unit preceding the current time unit includes:
   obtaining the third audio data transmitted by the sender during the second time unit preceding the current time unit from a front end of the synchronous queue;
 wherein:
  the synchronous queue is configured to store consecutive audio data transmitted by the sender during multiple consecutive third time units; and
  fifth audio data associated with the current time unit transmitted by the sender is stored at a rear end of the synchronous queue;

obtaining sixth audio data transmitted by the sender;
obtaining seventh audio data generated by the audio-acquisition device;
inserting the seventh audio data generated by the audio-acquisition device into the rear end of the synchronous queue; and
inserting the sixth audio data transmitted from the sender into the rear end of the synchronous queue.

6. An echo-reduction device comprising:
a first acquisition module configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit;
a second acquisition module configured to obtain third audio data transmitted by the sender during a second time unit preceding the current time unit;
an echo-reduction module configured to obtain fourth audio data by performing echo reduction on the first audio data based on at least information associated with the third audio data;
one or more data processors;
a computer-readable storage medium;
  wherein one or more of the first acquisition module, the second acquisition module, and the echo-reduction module are stored in the storage medium and configured to be executed by the one or more data processors; and
a processing module configured to, in response to a residue-echo coefficient associated with the current time unit being larger than a predetermined threshold,
  obtain fifth audio data generated by the audio-acquisition device of the receiver during a next time unit;
  obtain sixth audio data associated with a third time unit from a circular queue for remote-audio-frame-similarity-alignment-and-computation, the sixth audio data having a largest degree of similarity with the fifth audio data; and
  using a position of the sixth audio data in the circular queue for remote-audio-frame-similarity-alignment-and-computation as a remote-input position of an echo-reduction algorithm;
wherein the echo-reduction module is further configured to: obtain the fourth audio data by performing echo reduction through the echo-reduction algorithm on the first audio data based on at least information associated with the third audio data.

7. The device of claim 6, wherein:
the first acquisition module is further configured to: obtain the first audio data associated with the current time unit from a front end of an acquisition queue; and
the acquisition queue is configured to store seventh audio data generated by the audio-acquisition device during the current time unit based on at least information associated with the first audio signal related to a user voice and the second audio signal output from the audio-playback device of the receiver.

8. The device of claim 6, wherein:
the second acquisition module is further configured to: obtain the third audio data transmitted by the sender during the second time unit preceding the current time unit from a front end of a synchronous queue;
the synchronous queue is configured to store consecutive audio data transmitted by the sender during multiple consecutive third time units; and
seventh audio data associated with the current time unit transmitted by the sender is stored at a rear end of the synchronous queue.

9. The device of claim 6, further comprising:
a second queue insertion module configured to insert seventh audio data transmitted by the sender during the current time unit into a rear end of a synchronous queue.

10. An echo-reduction device comprising:
a first acquisition module configured to obtain first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit;
a second acquisition module configured to obtain third audio data transmitted by the sender during a second time unit preceding the current time unit;
an echo-reduction module configured to obtain fourth audio data by performing echo reduction on the first audio data based on at least information associated with the third audio data;
one or more data processors;
a computer-readable storage medium;
  wherein one or more of the first acquisition module, the second acquisition module, and the echo-reduction module are stored in the storage medium and configured to be executed by the one or more data processors;
a creation module configured to create a synchronous queue;
wherein:
  the second acquisition module is further configured to: obtain the third audio data transmitted by the sender during the second time unit preceding the current time unit from a front end of the synchronous queue;
  the synchronous queue is configured to store consecutive audio data transmitted by the sender during multiple consecutive third time units; and
  fifth audio data associated with the current time unit transmitted by the sender is stored at a rear end of the synchronous queue;
a third acquisition module configured to obtain sixth audio data transmitted by the sender and obtain seventh audio data generated by the audio-acquisition device; and
a first queue insertion module configured to insert the seventh audio data generated by the audio-acquisition device into the rear end of the synchronous queue and insert the sixth audio data transmitted from the sender into the rear end of the synchronous queue.

11. A non-transitory computer readable storage medium comprising programming instructions for echo reduction, the programming instructions configured to cause one or more data processors to execute operations comprising:
obtaining first audio data associated with a current time unit generated by an audio-acquisition device of a receiver based on at least information associated with a first audio signal acquired by the audio-acquisition device and a second audio signal output from an audio-playback device of the receiver, the second audio signal being output from the audio-playback device of the receiver based on at least information associated with second audio data transmitted previously by a sender before the current time unit;

obtaining third audio data transmitted by the sender during a second time unit preceding the current time unit; and obtaining fourth audio data by performing echo reduction on the first audio data based on at least information associated with the third audio data; and in response to a residue-echo coefficient associated with the current time unit being larger than a predetermined threshold,
- obtaining fifth audio data generated by the audio-acquisition device of the receiver during a next time unit;
- obtaining sixth audio data associated with a third time unit from a circular queue for remote-audio-frame-similarity-alignment-and-computation, the sixth audio data having a largest degree of similarity with the fifth audio data; and
- using a position of the sixth audio data in the circular queue for remote-audio-frame-similarity-alignment-and-computation as a remote-input position of an echo-reduction algorithm;

wherein the obtaining fourth audio data by performing echo reduction on the first audio data based on at least information associated with the third audio data includes: obtaining the fourth audio data by performing echo reduction through the echo-reduction algorithm on the first audio data based on at least information associated with the third audio data.

\* \* \* \* \*